Figure 1:
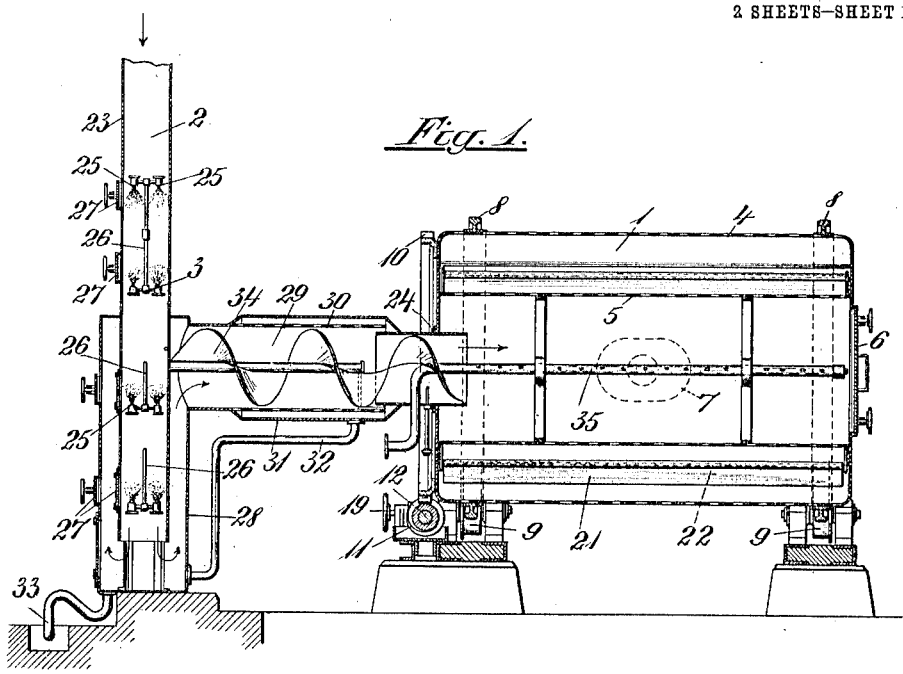

L. TOPF.
APPARATUS FOR TREATING MALT, SEEDS, AND THE LIKE.
APPLICATION FILED OCT. 14, 1909.

1,079,153.

Patented Nov. 18, 1913.
2 SHEETS—SHEET 1.

Witnesses
Mary W. Hammer
Albert Popkins

Inventor
Ludwig Topf
By
Sturtevant Mason
Attys

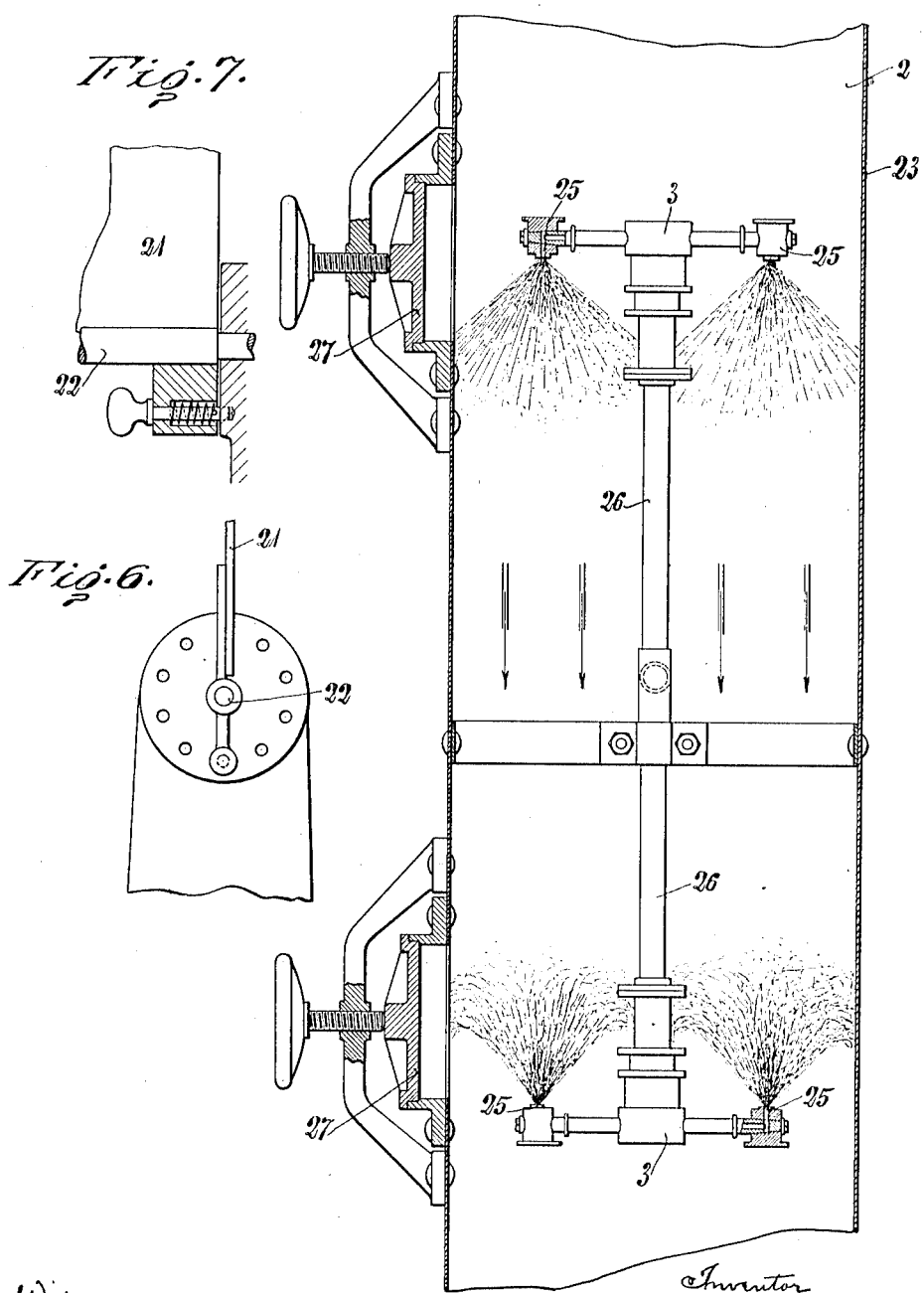

UNITED STATES PATENT OFFICE.

LUDWIG TOPF, OF ERFURT, GERMANY.

APPARATUS FOR TREATING MALT, SEEDS, AND THE LIKE.

1,079,153. Specification of Letters Patent. Patented Nov. 18, 1913.

Application filed October 14, 1909. Serial No. 522,622.

*To all whom it may concern:*

Be it known that I, LUDWIG TOPF, a citizen of the German Empire, residing at Erfurt, in the Kingdom of Prussia, Empire of Germany, have invented certain new and useful Improvements in Apparatus for Treating Malt, Seeds, and the like; and I do hereby declare the following to be a full, clear, and exact description of the invention, such as will enable others skilled in the art to which it appertains to make and use the same.

This invention relates to an apparatus which is intended to be employed for steeping, germinating and kiln-drying malt and the like, and is applicable also for aerating and drying seeds, wheat and the like.

As compared with apparatus of similar kind, this apparatus is characterized by the operation being performed in a practical manner and in the shortest time, and without fear of injury to the material treated.

As usual, a rotary drum is employed for receiving the material, the drum being connected with an air cooler, which is provided with a suitable air-moistening apparatus. In order not to permit excess moisture from the air to enter the drum, the air is passed through a water separator before its entrace into the drum.

The drum itself is of peculiar construction and is formed with pockets on its internal periphery, so that the material, on the rotation of the drum, is carried with it and then trickles slowly down again, whereby the heap is shaken up, which is particularly favorable, for instance, for the passage of air for the purpose of drying or aerating. This arrangement of the drum has also the advantage that it is excellently adapted for heating the material inasmuch as the heating surface is substantially increased. The pockets in the casing of the drum may be formed equi-axially, that is to say may be formed as double pockets, so that a rotation of the drum in both directions is possible and the same action takes place. The drum is also provided with stirrers or agitators, which during the operation are fixed or they may also be loosely arranged. A thorough intermingling of the material is produced by these stirrers, so that the operation is accelerated and a uniform working over of the entire material is obtained. Where the stirrers are fixed, they are arranged so as to be adjustable, so that they may be suitably adjusted according to requirements. The movable agitators have the advantage that they facilitate an easy discharge of the drum, while with the ordinary fixed agitators, the material frequently sticks in the compartments, so that the discharge can only be effected with difficulty and with a corresponding loss of time.

The air cooling apparatus consists of a chamber, into which the air is forced by a ventilating fan or the like, and which is preferably provided with a moistening device, which may be shut off, in order to impart to the air the moisture necessary for various purposes. This moistening is, for instance, effected by means of nozzles which work either in the same or in an opposite direction to the air current. The moistened air then enters the drum, being forced to pass through the water separator in which the superfluous water is caught and carried off before it reaches the drum.

The water separator consists substantially of a helix and this has on the one hand the advantage that to a certain extent it acts as a check or baffle to the air current, so that the water is deposited there, and on the other hand this helix conducts the air on its entrance into the drum to the outer side, so that it flows through the whole drum, which is of great importance for the proper treatment of the material. By the combination of these arrangements an excellent method of treating the material is obtained such as could not hitherto be obtained.

The invention will now be more particularly explained in some forms of construction, by way of example, in connection with the accompanying drawings, in which:—

Figure 2:
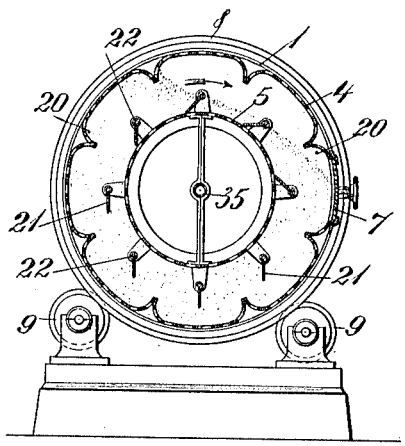
Figure 3:
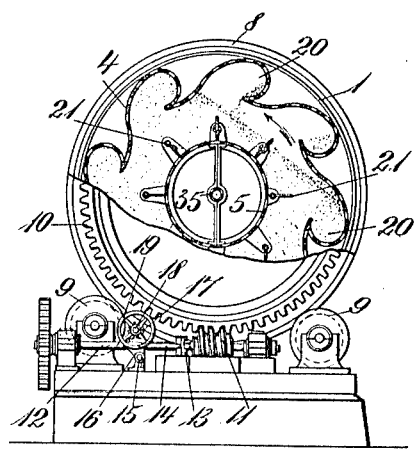
Figure 4:
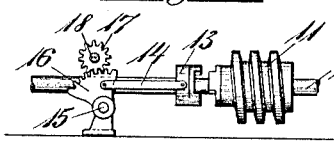

Figure 1 is a vertical longitudinal section of the apparatus as a whole; Figs. 2 and 3 are cross sections of the drum transversely to its longitudinal axis, and show two forms of construction thereof; Fig. 4 is an enlarged detail view of a portion of the driving gear. Fig. 5 is an enlarged vertical section through the air cooler. Fig. 6 is an enlarged detail end elevation of the means for holding the agitators in adjusted position; Fig. 7 is an enlarged detail side elevation, partly in section, of the same.

The apparatus comprises a drum 1 for receiving the material to be treated. The drum is fed with air through an air cooler 2, the air being moistened preferably by means of a moistening apparatus 3 which is adapted to be thrown out of action, while the air before entering the drum 1 passes through a water separator 29, where the surplus water carried, for instance in the form of drops along with air, is separated from it. The drum 1 consists of an outer jacket or casing 4, in which a continuous central pipe 5 is located, access being obtained to the inner pipe by a removable lid or cover 6, while the actual drum 1 is accessible by means of a man-hole 7 or the like. The drum 1 and central pipe 5 are herein shown as perforated.

The drum 1 is provided with annular runners 8, which travel on loose rollers 9, so that it is easily revoluble. It is driven by a worm wheel 10 at one end, which gears with a worm 11, mounted on a driving shaft 12 revolved in any suitable way. For throwing the drum 1 into and out of action, a clutch 13 is provided, which may be formed after the manner of clutch couplings, and is axially displaceable. This clutch is connected by a link 14 with a toothed segment 16 pivotal on a pin 15, the segment gearing with a pinion 17 mounted on the shaft 18 of a hand-wheel 19. When the driving gear is to be thrown out of action, that is to say the drum 1 stopped, the hand-wheel 19 is rotated in a suitable direction, and by means of the segment 16 the clutch 13 is disengaged. The drum 1 is also provided on its periphery with pockets 20, which carry the material up to a certain height and then allow it to slowly trickle down again. These pockets may, as shown in Fig. 3, be formed one sided or, as shown in Fig. 2, two sided, that is to say as double pockets, so that the drum 1 may be rotated in either direction.

In order to thoroughly mix the material stirrers or agitators 21 are provided, and these may, as shown in Fig. 2, be revolubly mounted on spindles 22, or they may be fixed during the operation, for instance, by means of bolts, wedges and the like, as shown in Fig. 3, where the agitators 21 may be seen in various positions. When the drum 1 is to be discharged, these agitators 21 are necessarily placed vertically, so that the material drops out without further assistance.

The air cooler 2 consists of a vertical pipe 23 into which the air is driven from above, for instance, by means of a ventilating fan, a piston or the like. It is provided with a moistening device, 3, which consists of nozzles 25 to which water is conveyed by pipes 26. These nozzles may be of any desired construction. When the air is charged with moisture, it passes out at the lower end of the pipe 23 into a casing or jacket 28 surrounding the same, from whence it reaches the drum 1 after passing through the water separator 29. This water separator 29 consists of a pipe 30, which is perforated and surrounded by an enlarged casing 31, which catches the separated water, and the latter is conveyed through a pipe 32 first to the casing 28 from whence it runs away, together with the water separated there, through another pipe 33. A kind of helicoidal surface 34 is provided for separating the water, which surface extends as far as the drum 1 and the pipe 5, and opposes the air current, so that the water is thereby separated or condensed from the air and also the air is distributed on its escape from the water separator 29 on its entrance into the drum 1. The water separator 29 is fixed and is packed tightly against the drum 1 by packing strips 24. Finally, in order, if necessary, to allow of water being directly introduced into the drum, a pipe 35 is provided which has suitable apertures inside the drum.

I declare that I claim is:—

1. An apparatus of the character described, comprising a rotary drum consisting of a perforated external casing provided with pocket-like conveyers, and an inner casing having agitators pivotally mounted thereon, said pockets being so formed as to inclose portions of the material which is carried within them, and trickles slowly down in small quantities during the rotation of the drum.

2. An apparatus of the character described, comprising a rotary drum consisting of a perforated external casing provided with pocket-like conveyers, an inner casing having agitators mounted thereon, and means whereby said agitators are adjusted in predetermined positions.

3. An apparatus of the character described, including in combination, a rotary drum consisting of a perforated external casing, pocket-like conveyers carried by said external casing and extending the whole length thereof, an inner casing having agitators positioned upon its periphery and extending the entire length thereof, and means whereby the material is carried a maximum period within the pockets and then allowed to trickle slowly down in small quantities during the rotation of the drum.

4. An apparatus of the character described, comprising a rotary drum consisting of a perforated external casing provided with pocket-like conveyers, and an inner casing having agitators adjustably mounted thereon, said pockets being formed with a substantially semicircular lifting surface extending the whole length of the casing, whereby the material is contained a maximum period within them, and then allowed to slowly trickle down in small quantities through the agitators.

In testimony whereof I affix my signature in presence of two witnesses.

LUDWIG TOPF.

Witnesses:
 Louis D. Mueller,
 Mathilde K. Held.

Copies of this patent may be obtained for five cents each, by addressing the "Commissioner of Patents, Washington, D. C."